(12) United States Patent
Agarwal et al.

(10) Patent No.: US 8,726,342 B1
(45) Date of Patent: May 13, 2014

(54) KEYSTORE ACCESS CONTROL SYSTEM

(71) Applicant: Oracle International Corporation, Redwood Shores, CA (US)

(72) Inventors: Amit Agarwal, Sunnyvale, CA (US); Srikant Krishnapuram Tirumalai, Milpitas, CA (US); Krishnakumar Sriramadhesikan, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/664,517

(22) Filed: Oct. 31, 2012

(51) Int. Cl.
*G06F 17/00* (2006.01)

(52) U.S. Cl.
USPC .............................................. 726/1

(58) Field of Classification Search
USPC .............................................. 726/1
See application file for complete search history.

(56) References Cited

U.S. PATENT DOCUMENTS

| | | | |
|---|---|---|---|
| 6,243,816 B1 | 6/2001 | Fang et al. | |
| 6,839,437 B1 | 1/2005 | Crane et al. | |
| 7,096,355 B1* | 8/2006 | Marvit et al. | 713/162 |
| 7,549,174 B1 | 6/2009 | Falkner et al. | |
| 7,805,755 B2 | 9/2010 | Brown et al. | |
| 7,823,190 B1 | 10/2010 | Kacarov et al. | |
| 2002/0080975 A1 | 6/2002 | Rich et al. | |
| 2002/0083178 A1 | 6/2002 | Brothers | |
| 2004/0117655 A1* | 6/2004 | Someshwar | 713/201 |
| 2008/0123855 A1 | 5/2008 | Thomas | |
| 2008/0133905 A1 | 6/2008 | Challener et al. | |
| 2008/0273706 A1 | 11/2008 | Noll | |
| 2009/0279703 A1 | 11/2009 | McLane et al. | |
| 2010/0023782 A1 | 1/2010 | Prakash et al. | |
| 2010/0125855 A1 | 5/2010 | Ferwerda et al. | |
| 2011/0047387 A1 | 2/2011 | Gover | |
| 2011/0258438 A1 | 10/2011 | Hildebrand | |
| 2012/0016856 A1 | 1/2012 | Gandhi et al. | |
| 2012/0265875 A1 | 10/2012 | Moran et al. | |

FOREIGN PATENT DOCUMENTS

| | | |
|---|---|---|
| EP | 0752635 B1 | 9/2001 |
| EP | 1380916 A1 | 1/2004 |
| EP | 1463322 A2 | 9/2004 |
| GB | 2471282 A | 12/2010 |
| WO | 2011150450 A1 | 12/2011 |

OTHER PUBLICATIONS

Adobe AIR ADT code signing options, http://help.adobe.com/en_US/air/build/WS5b3ccc516d4fbf351e63e3d118666ade46-7f72.html, last downloaded Nov. 6, 2012.

(Continued)

*Primary Examiner* — Teshome Hailu
(74) *Attorney, Agent, or Firm* — Miles & Stockbridge P.C.

(57) ABSTRACT

A keystore access system is provided that controls access to a keystore. The keystore access control system receives a request to access content of the keystore from a software application component. The keystore access control system applies a stored authorization policy to the request to determine whether access to the content of the keystore is granted. The keystore access system further grants the software application component access to the content of the keystore when it is determined that access to the content of the keystore is granted. The keystore access system further denies the software application component access to the content of the keystore when it is determined that access to the content of the keystore is not granted.

20 Claims, 4 Drawing Sheets

(56) References Cited

OTHER PUBLICATIONS

Implementing your own keyStore, http://www.blackberry.com/developers/docs/7.1.0api/net/rim/device/api/crypto/doc-files/implementing_keystore.html, last downloaded Nov. 6, 2012.
What is the BlackBerry KeyStore, http://btsc.webapps.blackberry.com/btsc/viewdocument.do;jsessionid=3573BB4FD3E3FCF127551937EC7F4A0B?externalId=KB25622&sliceId=1&cmd=displayKC&docType=kc&noCount=true&ViewedDocsListHelper=com.kanisa.apps.common.BaseViewedDocsListHelperImp1, last downloaded Oct. 12, 2012.
Amit Agarwal et al., U.S. Appl. No. 13/655,535, filed Oct. 19, 2012.
A. Cilardo et al., "An FPGA-based Key-Store for Improving the Dependability of Security Services", University of Naples Federico II, http://citeseerx.ist.psu.edu/viewdoc/summary?doi=10.1.1.59.5775 (last visited on Oct. 26, 2012).

* cited by examiner

| Effect | Application Stripe Name | Keystore | Access | Context | Environment | |
|---|---|---|---|---|---|---|
| GRANT | Application1 | Identity Keystore | Full Access | - | - | 310 |
| GRANT | Application2 | Identity Keystore | Read-only Access | - | - | 320 |
| DENY | Application3 | Identity Keystore | Full Access | Host = "hostname1" | - | 330 |
| GRANT | Application4 | Identity Keystore | Full Access | Role = "Administrator" | - | 340 |
| GRANT | Application5 | Identity Keystore | Full Access | Host = "hostname2" | Time > "9:00 AM" AND Time < "5:00 PM" | 350 |

KEYSTORE ACCESS CONTROL SYSTEM

FIELD

One embodiment is directed to a computer system, and more particularly, to a computer system that manages one or more keystores.

BACKGROUND

Complex software systems that include multiple software application components, such as Java® 2 Enterprise Edition ("J2EE") systems, generally require that each software application component be able to establish secure communications with each other. In the context of secure communication, software systems generally rely on public key infrastructure ("PKI")-based communications, which generally require a presentation of a cryptographic key or certificate, authorization of the key or certificate, and a secure exchange of information between the two or more software application components.

"Keystores" can be used to store cryptographic keys and certificates for such secure communications, where a "keystore" is defined as a storage entity configured to store cryptographic keys and certificates that is stored within a repository. A common repository example for a keystore is a physical computer file on a file system. Other repository examples for a keystore are a lightweight directory access protocol ("LDAP") server, a database, and a hardware device.

Traditional software systems typically protect their keystores using a password. In general, anytime a software application component desires to access a keystore, the software application component can request access to the keystore and provide a password to the keystore. The keystore can receive the password and compare it to a password stored within the keystore. If the password received from the software application component matches the password stored within the keystore, the keystore can grant access to the keys or certificates stored within the keystore to the software application component. If the password received from the software application component does not match the password stored within the keystore, the keystore can deny the software application component access to the keys or certificates stored within the keystore to the software application component. Thus, a software application component that requires access to a keystore, is also generally required to store and maintain the password associated with the keystore. While there are hardware devices that can allow access through non-password based authentication mechanisms (e.g., biometric checks, smartcard checks, and device-based checks), these mechanisms are typically too rare and costly to be deployed in an enterprise application.

SUMMARY

One embodiment is directed to a keystore access control system that controls access to a keystore. The keystore access control system models an authorization policy configured to control access to the keystore, where the keystore includes a storage entity stored on a repository. The keystore access control system further stores the authorization policy in a policy store. The keystore access control system further receives a request to access content of the keystore from a software application component. The keystore access control system further applies the stored authorization policy to the request to determine whether access to the content of the keystore is granted. The keystore access system further grants the software application component access to the content of the keystore when it is determined that access to the content of the keystore is granted. The keystore access system further denies the software application component access to the content of the keystore when it is determined that access to the content of the keystore is not granted.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates an example diagram of an authorization policy store including authorization policies, according to an embodiment of the invention.

DETAILED DESCRIPTION

Figure 1:
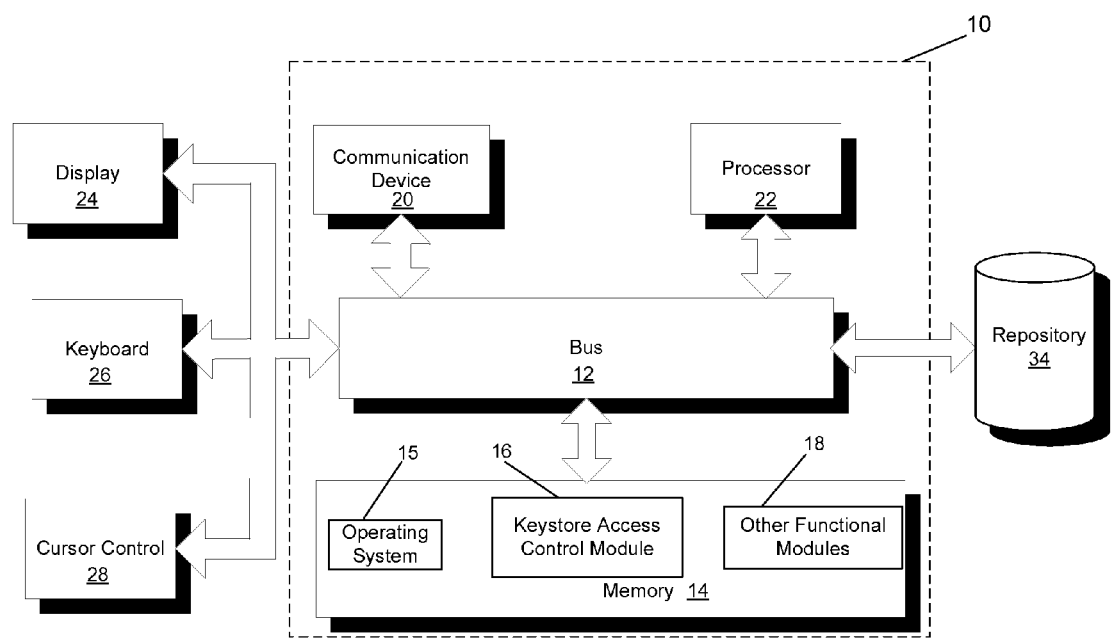
FIG. 1 illustrates a block diagram of a keystore access control system that can implement an embodiment of the invention.

In one embodiment, a keystore access control system is provided that can use fine-grained authorization policies to control runtime access of a keystore. One or more fine-grained authorization policies can be defined that control which software application components can access the keystore. When a software application component requests access the keystore, the keystore access control system can apply the one or more fine-grained authorization policies to the request to determine whether to grant or deny the software application component access to the keystore. The keystore access control system can then grant or deny the request based on the application of the one or more fine-grained authorization policies.

As previously described, traditional software systems typically protect their keystores using a password. Because software application components are generally required to provide traditional software systems with the password in order to gain access to the keystores, the responsibility of storing and maintaining the password typically lies with the requesting software application component. For example, if a software application component has a requirement to store and manage two different key stores (e.g., "identity" key stores and "trust" key stores), the software application component also has the responsibility of knowing and storing passwords for both keystores. If the software application component forgets the password, there is generally no way for the software application component to regain access to the keystore, and thus, in this scenario, all data stored within the key store could be lost permanently.

Thus, in traditional software systems, software application components are generally burdened with maintaining and storing a set of passwords for keystores in a secure place, such as storing the passwords within a secure file. Further, in a complex environment with multiple software application components that require access to their keystores, each software application component is generally required to store its passwords securely. However, a software application component may be unsophisticated and may store its password in an unsecure manner, such as storing the password in an unprotected text file. A single unsecure storage of a keystore password can endanger an entire deployment, as the unsecure storage can be exploited, and can serve as a weak link for the entire deployment. More specifically, someone could exploit the software application component, gain access to the unprotected text file that includes the keystore password, gain access to the keystore and do significant damage to the deployment by exposing the contents of the keystore.

Further, by requiring each software application component to manage its own passwords, different software application components will use different mechanisms (both secure and unsecure) for storing passwords to keystores, thus producing an inconsistent security policy for the deployment. Finally, the requirement for each software application component to maintain and store its own keystore passwords creates additional overhead for the software application components. According to certain embodiments of the invention, a keystore access control system can, at least in part, control access to one or more keystores while preventing software application components from having to maintain and store passwords related to keystores, as will be described below in greater detail.

FIG. 1 illustrates a block diagram of a keystore access control system 10 that can implement one embodiment of the invention. Keystore access control system 10 includes a bus 12 or other communications mechanism for communicating information between components of keystore access control system 10. Keystore access control system 10 also includes a processor 22, operatively coupled to bus 12, for processing information and executing instructions or operations. Processor 22 may be any type of general or specific purpose processor. Keystore access control system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Keystore access control system 10 further includes a communication device 20, such as a network interface card or other communications interface, to provide access to a network. As a result, a user may interface with keystore access control system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with keystore access control system 10.

According to one embodiment, memory 14 can store software modules that may provide functionality when executed by processor 22. The modules can include an operating system 15, a keystore access control module 16, as well as other functional modules 18. Operating system 15 can provide an operating system functionality for keystore access control system 10. Keystore access control module 16 can provide functionality for controlling access to a keystore as will be described in more detail below. In certain embodiments, keystore access control module 16 can comprise a plurality of modules, where each module provides specific individual functionality for controlling access to a keystore. Keystore access control system 10 can also be part of a larger system. Thus, keystore access control system 10 can include one or more additional functional modules 18 to include the additional functionality. For example, functional modules 18 may include modules that provide additional functionality, such as a module of the "Oracle Fusion Middleware" product from Oracle Corporation.

Processor 22 can also be operatively coupled via bus 12 to a repository 34. Repository 34 can store data, such as one or more keystores. In one embodiment, repository 34 is a database. In this embodiment, repository 34 can store data in an integrated collection of logically-related records or files. Further, in this embodiment, repository 34 can be an operational database, a distributed database, an end-user database, an external database, an in-memory database, a document-oriented database, a real-time database, a relational database, an object-oriented database, or any other database known in the art. In an alternate embodiment, repository 34 can be a file of a file system. In another alternate embodiment, repository 34 can be an LDAP server. In yet another alternate embodiment, repository 34 can be a hardware device (such as a hardware storage module).

Figure 2:
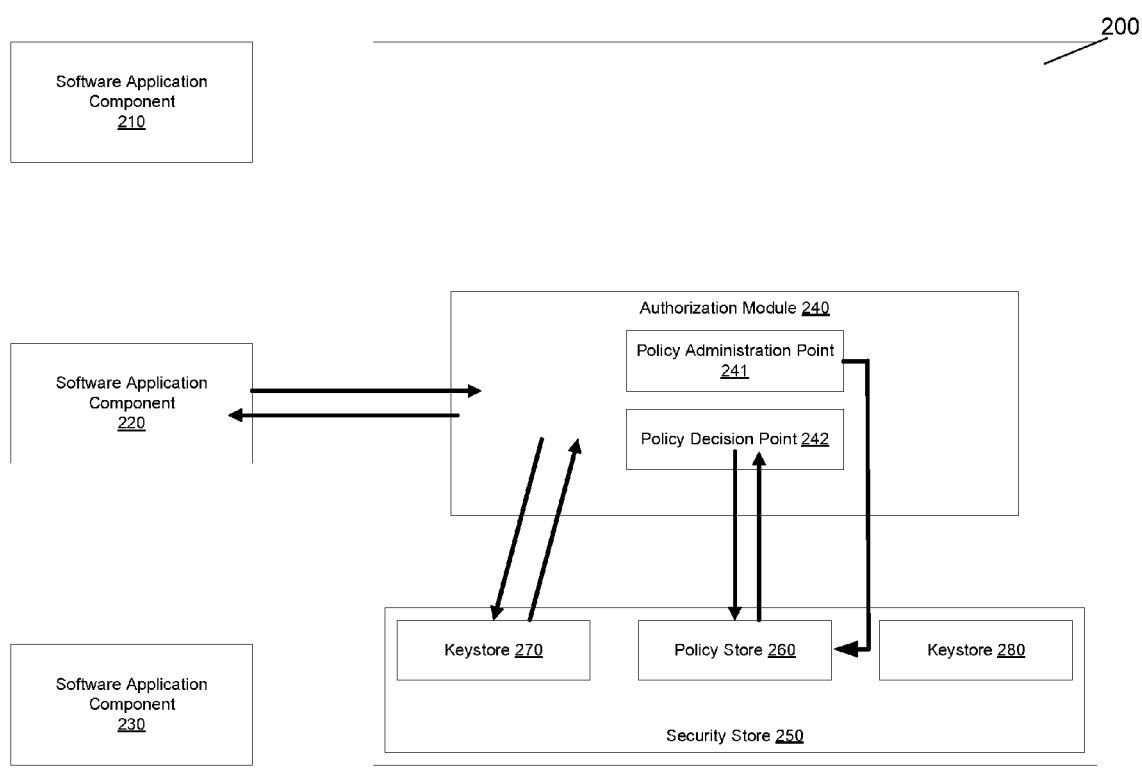
FIG. 2 illustrates a block diagram of an enterprise software application environment that includes a keystore access control system, according to an embodiment of the invention.

FIG. 2 illustrates a block diagram of an enterprise software application environment that includes a keystore access control system 200, according to an embodiment of the invention. In one embodiment, keystore access control system 200 is identical to keystore access control system 10 of FIG. 1. An enterprise software application environment is an environment of an enterprise software application, where an enterprise software application can include a collection of software application components configured to provide business functionality, such as order processing, procurement, production scheduling, customer information management, energy management, or accounting. An enterprise software application can be hosted on the enterprise software application environment, where the enterprise software application environment can include any number of servers, and can provide simultaneous services to a large number of users, typically over a computer network. In the illustrated embodiment, the enterprise software application environment includes keystore access control system 200 which provides functionality for controlling access to one or more keystores, as is described below in greater detail. Also, in the illustrated embodiment, the enterprise software application environment also includes software application components 210, 220, and 230. Software application components 210, 220, and 230 are each a component of a software application, where a software application is any collection of computer programs and/or modules configured to perform specified functionality. An example of a software application is the product "Oracle WebLogic Server" by Oracle Corporation. Another example of a software application is the product "Oracle WebCenter" by Oracle Corporation. However, the illustrated embodiment is merely an example embodiment, and in alternate embodiments, an enterprise software application environment can include any number of software application components.

As previously described, software application components 210, 220, and 230 can establish secure communications with each other in order to send and receive information, while reducing the risk that the communications with be intercepted by a third party. Such secure communications can be based on PKI-based communications, which can require a presentation of a cryptographic key or certificate, authorization of the key or certificate, and a secure exchange of information between the two or more software application components. Thus, application components 210, 220, and 230 can require access to one or more keys or certificates, in order to securely communicate with each other. As is described below in greater detail, these keys and certificates can be stored within one or more keystores, and keystore access control system 200 can, at least in part, control access to the one or more keystores by using fine-grained authorization policies to evaluate requests for access to the one or more keystores.

According to the embodiment, keystore access control system 200 includes authorization module 240 which is configured to model one or more authorization policies. The one or more authorization policies can be computer code-based authorization policies that control access to one or more keystores. Authorization module 240 is further configured to apply one or more authorization policies towards requests to access one or more keystores, where the requests can be sent by software application components (such as software application components 210, 220, and 230). Authorization module 240 is further configured to grant or deny access to one or more keystores based on the application of one or more authorization policies.

According to the embodiment, authorization module 240 is composed of at least two sub-modules, policy administration point 241 and policy decision point 242. Policy administration point 241 is configured to model an authorization policy. An authorization policy is a rule, or set of rules, that controls access to a keystore. An authorization policy can be authored for one or more subjects (e.g., software application components).

In one embodiment, an authorization policy can be modeled using an authorization policy framework. An example of an authorization policy framework configured to model one or more authorization policies is a Java® Authentication and Authorization Service ("JAAS") framework. The JAAS framework is a Java® library that implements a version of a Pluggable Authentication Module ("PAM") framework. The JAAS framework can be used to model authentication policies to reliably and securely determine who is executing code, regardless of whether the code is running as a software application, an applet, a bean, or a servlet. The JAAS framework provides a basic policy model that can be used to model authorization policies to ensure software applications have the appropriate access control rights required to perform requested actions.

Another example of an authorization policy framework configured to model one or more authorization policies is an Oracle Platform Security Services ("OPSS") framework, which is a product from Oracle Corporation. The OPSS framework provides a Java® policy provider that supports computer code-based and subject-based authorization. The OPSS framework can be used to model authorization policies that can be partitioned based on a software application component. The OPSS framework also supports role inheritance hierarchies. The OPSS framework further provides an advanced policy model that includes elements such as resource type and entitlement, where a resource type is a type of secured artifact (such as a keystore) created by an application developer, and where an entitlement represents a reusable set of actions on one or more resources (such as one or more keystores). Thus, the OPSS framework can be used to define and manage complex authorization policies.

Policy decision point 242 is configured to apply an authorization policy to a request and generate an authorization decision. An authorization decision is a result of applying an authorization policy to a request and determining whether a subject can perform an action on a keystore. An authorization decision can be represented as a "GRANT" value or a "DENY" value, with a "GRANT" value signifying that the subject can perform the action on the keystore, and with a "DENY" value signifying that the subject cannot perform the action on the keystore.

A request can include a subject (e.g., software application component) or a set of subjects, a keystore or a set of keystore, an action or set of actions, an environment, and a context. An environment is defined as a set of characteristic attributes independent of a particular subject, keystore, or action. An example of an environment is time. A context is defined as a set of characteristic attributes of the subject, keystore, or action. Examples of context include an application stripe associated with a software application component, a host associated with a software application component, a group associated with a software application component, or a role associated with a software application component. An application stripe is a namespace of a software application component, and is used to identify a software application component. A host is a name of a server, or other machine, that hosts the software application component. A group is a collection of identities or users in a system. A system typically has an authoritative source of identities or users in the system, where these identities or users can be grouped into an entity identified as a group. In one embodiment, the identities or users of a group can represent identities or users of software application components where the software application components are grouped based on application stripe name. For example, a group can be defined as including five software application components (e.g., Application1, Application2, Application3, Application4, and Application5). A role is also a collection of identities or users, where the collection is grouped by business function. For example, a role can be an administrative role, and can be assigned to one or more identities or users that are assigned to an administrative business function. In the above example, one or more identities or users of software application components can be grouped based on business function.

Other examples of context include one or more keys or certificates of the keystore, or the entire content of the keystore. Further, additional examples of context include the type of access to the keystore, such as full access, read-only access, or write-only access. As an example, read-only access can include such actions as retrieving a keystore from a repository and retrieving one or more keys or certificates from the keystore. Also as an example, write-only access can include such actions as creating a keystore, creating one or more keys or certificates within the keystore, updating one or more keys or certificates within the keystore, deleting a keystore, or deleting one or more keys or certificates from the keystore. Full access can include actions that are included in either read-only access or write-only access. Environment and context can be used to more finely refine the applicable policy to generate the authorization decision.

In the illustrated embodiment, authorization module 240 includes sub-modules policy administration point 241 and policy decision point 242. However, in an alternate embodiment, authorization module 240 performs the functionality of sub-module policy administration point 241 and sub-module policy decision point 242 itself.

According to an embodiment, an example of an authorization policy is: GRANT (FULL ACCESS, //security_store/Application1/identity_keystore.ks, //hostname/Application))

This authorization policy can be read as granting full access to the keystore "identity_keystore.ks" to a software application component entitled "Application1," when the software application component is executed on host "hostname." According to the embodiment, when a software application component (such as software application components 210, 220, or 230) sends a request to access a keystore to keystore access control system 200, authorization module 240 can apply the aforementioned authorization policy and determine whether the requesting software application component has an application stripe name of "Application1," and determine whether the requesting software application component is executed on a "hostname" host. Based on these determinations, authorization module 240 can determine whether to grant or deny the requesting software application component access to the keystore.

In another example embodiment, rather than controlling access to a single keystore, an authorization policy can control access to a plurality of keystores. According to the example embodiment, a software application component may require access to a plurality of keystores. As one example, an authorization policy can be modeled to give full access to all keystores within a single application stripe. Thus, a single authorization policy can be modeled for the plurality of keystores, which can result in a consistent authorization model for the plurality of keystores.

Further, in alternate embodiments, the authorization policy can be more finely grained than in the previous example embodiments. For example, in one example embodiment, rather than granting or denying full access to a keystore, an authorization policy can grant or deny limited access to the keystore. As one example, the authorization policy can grant or deny read-only access to the keystore. In the example, read-only access can include such actions as retrieving a keystore from a repository and retrieving one or more keys or certificates from the keystore. As another example, the authorization policy can grant or deny write-only access to the keystore. In the example, write-only access can include such actions as creating a keystore, creating one or more keys or certificates within the keystore, updating one or more keys or certificates within the keystore, deleting a keystore, or deleting one or more keys or certificates from the keystore.

In another example embodiment, the authorization policy can grant or deny access to a keystore to a software application component, based on a context associated with the software application component, such as a host where the software application component is executed. In another example embodiment, the authorization policy can grant or deny access to a keystore to a software application component based on an environment associated with the software application component, such as a time of day, or day of a week, that the request is received. In another example embodiment, a type of device where the software application component is executed can determine if the action is permitted, denied, or conditionally permitted. As an example, a request to access a keystore from a software application component that is executed on a tablet device, or other mobile device, can be permitted only when the request is received over a secure network (such as a virtual private network), and the permitted action is only to read one or more specific keys or certificates stored within the keystore, as opposed to all the keys and certificates stored within the keystore.

As an example of a more finely grained authorization policy, a primary software application component can be executed on a first host and a secondary software application component can be executed on a second host. The secondary software application component can act as a backup to the primary software application component in a disaster scenario (such as a failure of the primary software application component or first host). In such a disaster scenario, the second software application component can require access to one or more keystores, but in all other scenarios, only the first software application component should have access to the one or more keystore. In this embodiment, an authorization policy could be modeled to grant full access to the one or more keystores to the primary software application component when executed on the first host. However, in a disaster scenario, the authorization policy could be modified to grant the secondary software application component full access to the one or more keystores when executed on the second host. In an alternate embodiment, the authorization policy could be modified to only grant the secondary software application component read-only access to the one or more keystores when executed on the second host. Authorization policies are discussed in further detail in relation to FIG. 3.

According to the embodiment, keystore access control system 200 also includes security store 250. Security store 250 is a storage entity configured to store one or more authorization policy stores (also identified as "policy stores"), and one or more keystores. Security store 250 can be any type of storage entity known in the art. For example, security store 250 can be a database, a linked list, a lookup table, or a computer file. In an embodiment where security store 250 is a database, security store 250 can be an operational database, a distributed database, an end-user database (i.e., a database that includes data developed by individual users, such as a document, a spreadsheet, or another type of file), an external database, an in-memory database, a document-oriented database, a real-time database, a relational database, an object-oriented database, or any other database known in the art. According to an embodiment, security store 250 is part of a security framework for an enterprise software application environment. In one embodiment, the security framework is an "Oracle Platform Security Services" product from Oracle Corporation.

In the illustrated embodiment, security store 250 includes authorization policy store 260 (also identified as "policy store 260"). Policy store 260 is a storage entity configured to store modeled authorization policies. Policy store 260 can be any type of storage entity known in the art. For example, policy store 260 can be a database, a linked list, a lookup table, or a computer file. In an embodiment where policy store 260 is a database, policy store 260 can be an operational database, a distributed database, an end-user database, an external database, an in-memory database, a document-oriented database, a real-time database, a relational database, an object-oriented database, or any other database known in the art.

According to the illustrated embodiment, security score 250 further includes keystores 270 and 280. As previously described a keystore is a storage entity configured to store one or more cryptographic keys or certificates. The illustrated embodiment of FIG. 2 is merely an example embodiment, and in alternate embodiments, security store 250 can include any number of keystores. In certain embodiments, keystores 270 and 280 can be encrypted. One example of such an encryption is a password encryption, where keystores 270 and 280 can be encrypted using a password, and a requesting software application component can provide the password to the keystore in order to gain access to keystores 270 and 280. In these embodiments, the encryption of keystores 270 and 280 is separate and independent from the one or more authorization policies that are modeled and applied by authorization module 240. In alternate embodiments, at least one of the one or more authorization policies that are modeled and applied by authorization module 240 defines how keystores 270 and 280 are encrypted. Thus, in these embodiments, the encryption of keystores 270 and 280 is coupled to the one or more authorization policies that are modeled and applied by authorization module 240.

An example embodiment is now described. In the example embodiment, software application component 220 sends a request to access keystore 270. Of course, this is only an example embodiment, and in alternate embodiments, any software application component can send a request to access any keystore. In one embodiment, the request can be a request to access content of keystore 270, such as one or more keys or certificates of keystore 270. According to the example embodiment, software application component 220 sends the request to authorization module 240. According to the embodiment, prior to software application component 220 sending the request to authorization module 240, policy administration point 241 of authorization module 240 models one or more authorization policies configured to control access to keystore 270, and stores the one or more authorization policies within policy store 260. The modeling of the one or more authorization policies can involve defining the authorization policy to grant or deny a software application component access to the keystore based on a context and/or an environment. Examples of context can include an application stripe associated with a software application component, a host associated with a software application component, a group associated with a user of a software application component, or a role associated with a user of a software application component. Other examples of context can include one or more keys or certificates of the keystore, or the entire content of the keystore. Other examples of context can include the type of access to the keystore (e.g., full access, read-only access, or write-only access). An example of an environment can be time.

When authorization module 240 receives the request from software application component 220, policy decision point 242 retrieves the one or more authorization policies from policy store 260, and applies the one or more authorization policies to the request to determine whether access to keystore 270 is granted to software application component 220. The application of the one or more authorization policies can involve identifying software application component 220, identifying an environment and a context associated with software application component 220, and determining whether each authorization policy of the one or more authorization policies grants or denies software application component 220 access to keystore 270 based on the identification of software application component 220, the identity of the environment associated with software application component 220, and the identity of the context associated with software application component 220. When it is determined that access is granted, authorization module 240 grants software application component 220 access to keystore 270. In this scenario, software application component 220 can then access content of keystore 270 consistent with the access granted to software application component 220. When it is determined that access is denied, authorization module 240 denies software application component 220 access to keystore 270. In this scenario, software application component 220 cannot access content of keystore 270.

FIG. 3 illustrates an example diagram of an authorization policy store 300 including authorization policies 310, 320, 330, 340, and 350, according to an embodiment of the invention. According to the embodiment, authorization policies 310, 320, 330, 340, and 350 each represent an authorization policy that can be modeled by an authorization module (such as authorization module 240 of FIG. 2) and stored within authorization policy store 300. One of ordinary skill in the art would readily appreciate that the illustrated embodiment is an example embodiment, and that, in alternate embodiments, authorization policy store 300 can include any number of authorization policies.

As previously described, an authorization policy is a rule, or set of rules, that controls access to a keystore. An authorization policy can be authored for one or more subjects (e.g., software application components). According to the embodiment, an authorization policy can include an effect component. The effect component can represent an effect, or result, of an authorization policy when it is determined that the authorization policy applies to a request to access a keystore. In the illustrated embodiment, an effect of an authorization policy can be to grant a requesting software application component access to a keystore or to deny the requesting software application component access to a keystore.

Also according to the embodiment, the authorization policy can include an application stripe name component. The application stripe name component can represent one or more software application components that the authorization policy applies to. In addition, according to the embodiment, the authorization policy can include a keystore component. The keystore component can represent one or more keystores that the authorization policy applies to.

Further, the authorization policy can include an access component. The access component can represent a level of access to a keystore that the authorization policy controls. In one embodiment, the level of access to the keystore can be full access to the keystore. In another embodiment, the level of access to the keystore can be limited access to the keystore, such as read-only access to the keystore or write-only access to the keystore. As an example, read-only access can include such actions as retrieving a keystore from a repository and retrieving one or more keys or certificates from the keystore. Also as an example, write-only access can include such actions as creating a keystore, creating one or more keys or certificates within the keystore, updating one or more keys or certificates within the keystore, deleting a keystore, or deleting one or more keys or certificates from the keystore. Full access can include actions that are included in either read-only access or write-only access.

The authorization policy can further include a context component. A context component represents one or more characteristic attributes of a subject (e.g., software application component), where the one or more characteristic attributes are used to define the authorization component. Examples of a context component can include an application stripe associated with a software application component, a host associated with a software application component, a group associated with a software application component, or a role associated with a software application component. The authorization policy can also include an environment component. An environment component represents one or more characteristic attributes independent of a particular subject (e.g., software application component), where the one or more characteristic attributes are used to define the authorization component. An example of an environment component is time. Other examples of environment components include a type of device that a software application component is executed on, whether a request to access a keystore is being made over a private or public network, whether a request to access a keystore is being made over a virtual private network, or whether a request to access a keystore is being made over a secure network or an unsecured network.

Thus, in the embodiment, authorization policy 310 includes an effect component with a value of "GRANT," an application stripe name component with a value of "Application1," a keystore component with a value of "Identity Keystore," and an access component with a value of "Full Access." Thus, authorization policy 310 grants a software application component with an application stripe name of "Application1" full access to a keystore with a keystore name of "Identity Keystore." Further, authorization policy 320 includes an effect component with a value of "GRANT," an application stripe name component with a value of "Application2," a keystore component with a value of "Identity Keystore," and an access component with a value of "Read-only Access." Thus, authorization policy 320 grants a software application component with an application stripe name of "Application2" read-only access to a keystore with a keystore name of "Identity Keystore."

Further, according to the embodiment, authorization policy 330 includes an effect component with a value of "DENY," an application stripe name component with a value of "Application3," a keystore component with a value of "Identity Keystore," an access component with a value of "Full Access," and a context component with a value of "Host='hostname1'." Thus, authorization policy 330 denies a software application component with an application strip name of "Application3" and associated with a host with a name of "hostname1" full access to a keystore with a keystore name of "Identity Keystore." Similarly, authorization policy 340 includes an effect component with a value of "GRANT," an application stripe name component with a value of "Application4," a keystore component with a value of "Identity Keystore," and access component with a value of "Full Access," and a context component with a value of "Role='Administrator'." Thus, authorization policy 340 grants a software application with an application strip name of "Application4" and associated with a role with a name of "Administrator" full access to a keystore with a keystore name of "Identity Keystore."

In addition, according to the embodiment, authorization policy 350 includes an effect component with a value of "GRANT," an application stripe name component with a value of "Application5," a keystore component with a value of "Identity Keystore," an access component with a value of "Full Access," a context component with a value of "Host='hostname2'," and an environment component with values of "Time >'9:00 AM'" and "Time <5:00 PM." Thus, when the time is between 9:00 AM and 5:00 PM, authorization policy 350 grants a software application component with an application strip name of "Application5" and associated with a host with a name of "hostname2" full access to a keystore with a keystore name of "Identity Keystore."

As one of ordinary skill in the art would appreciate, FIG. 3 illustrates an example diagram of authorization policy store 300 that includes authorization policies (i.e., authorization policies 310, 320, 330, 340, 350), where the authorization policies are in an example format, according to one embodiment. However, in alternate embodiments, the authorization policies could be in a different format, and still be within a scope of the invention. Further, while authorization policies 310, 320, 330, 340, and 350 are example authorization policies, one of ordinary skill in the art would readily appreciate that, in alternate embodiments, other authorization policies can be stored within authorization policy store 300.

Figure 4:
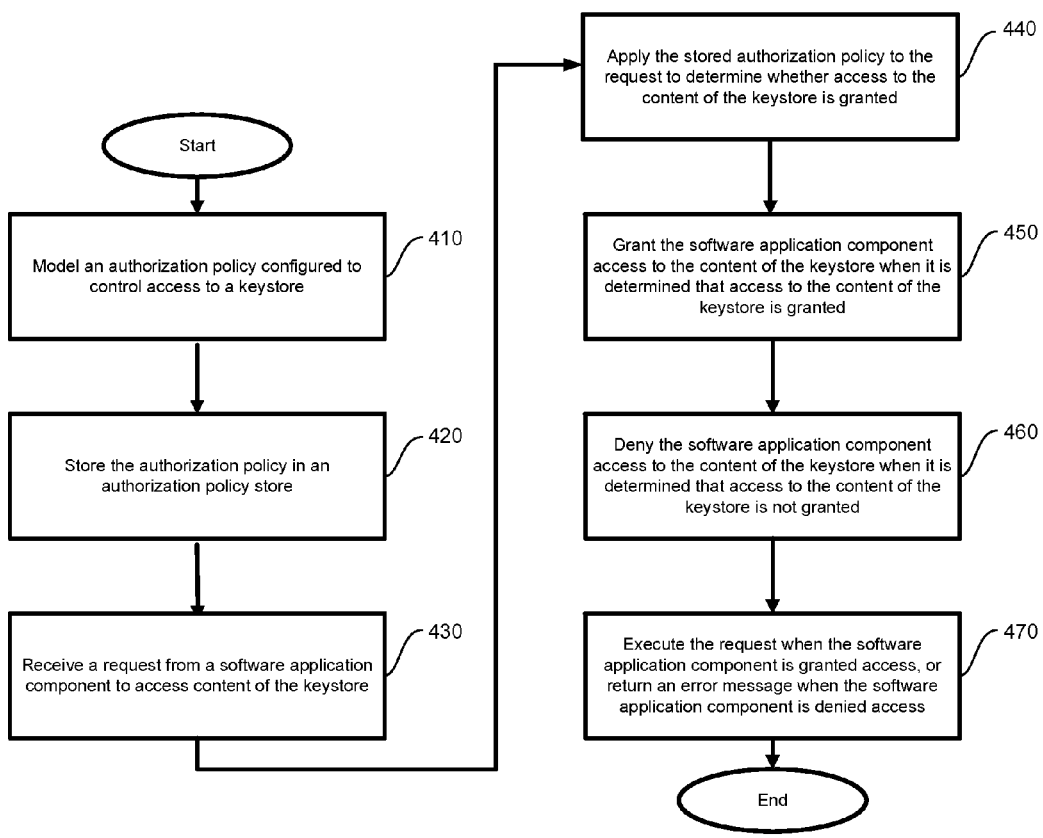
FIG. 4 illustrates a flow diagram of the functionality of a keystore access control module, according to an embodiment of the invention.

FIG. 4 illustrates a flow diagram of the functionality of a keystore access control module (such as keystore access control module 16 of FIG. 1), according to an embodiment of the invention. In one embodiment, the functionality of the flow diagram of FIG. 4, described below, is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

The flow begins and proceeds to 410. At 410, an authorization policy configured to control access to a keystore is modeled. In one embodiment, the keystore can include a storage entity stored on a repository. Also, in one embodiment, the modeling the authorization policy can further include defining the authorization policy to grant or deny a software application component access to the keystore based on at least one of an environment or a context. The flow proceeds to 420.

At 420, the authorization policy is stored in an authorization policy store. In one embodiment, the authorization policy store is a storage entity configured to store modeled authorization policies. The flow proceeds to 430.

At 430, a request to access content of the keystore is received from a software application component. In one embodiment, the content of the keystore includes, at least one of, one or more cryptographic keys, or one or more cryptographic certificates. The flow proceeds to 440.

At 440, the stored authorized policy is applied to the request to determine whether access to the content of the keystore is granted. In one embodiment, the applying the stored authorization policy to the request further includes: identifying the software application component; identifying an environment and a context associated with the software application component; and determining whether the authorization policy grants or denies the software application component access to the keystore based on the identification of the software application component, the identity of the environment associated with the software application component, and the identity of the context associated with the software application component.

According to the embodiment, an environment can be a set of characteristic attributes that are independent of a subject, keystore, or action of the authorization policy. An example of an environment is time. Also according to the embodiment, a context is defined as a set of characteristic attributes of the subject, keystore, or action. Examples of context include an application stripe associated with the software application component, a host associated with the software application component, a group associated with the software application component, or a role associated with the software application component. Other examples of context include one or more keys or certificates of the keystore, or the entire content of the keystore. Further, additional examples of context include the type of access to the keystore, such as full access, read-only access, or write-only access. The flow proceeds to 450.

At 450, the software application component is granted access to the content of the keystore when it is determined that access to the content of the keystore is granted. In one embodiment, the granting the software application component access to the content of the keystore can include granting the software application component full access to the content of the keystore. In another embodiment, the granting the software application component access to the content can include granting the software application component limited access to the content of the keystore. Examples of limited access to the content of the keystore can include read-only access to the content of the keystore or write-only access to the content of the keystore. In one embodiment, read-only access can include such actions as retrieving a keystore from a repository and retrieving one or more keys or certificates from the keystore. Also in one embodiment, write-only access can include such actions as creating a keystore, creating one or more keys or certificates within the keystore, updating one or more keys or certificates within the keystore, deleting a keystore, or deleting one or more keys or certificates from the keystore. Further, full access can include actions that are included in either read-only access or write-only access. Another example of limited access to the content of the keystore can include access to only one or more cryptographic keys or cryptographic certificates of the keystore. The flow proceeds to 460.

At 460, the software application component is denied access to the content of the keystore when it is determined that access to the content of the keystore is denied. The flow proceeds to 470.

At 470, the request to access the content of the keystore is executed when the software application component is granted access to the content of the keystore, or an error message is returned when the software application component is denied access to the content of the keystore. For example, if the request to access the content of the keystore is a request to create a new keystore, the new keystore is created when the software application component is granted access to the content of the keystore. If the request to access the content of the keystore is a request to access a key or certificate within the keystore, the key or certificate is accessed when the software application component is granted access to the content of the keystore. If the request to access the content of the keystore is a request to update a key or certificate within the keystore, the key or certificate is updated when the software application component is granted access to the content of the keystore. If the request to access the content of the keystore is a request to delete a key or certificate within the keystore, the key or certificate is deleted when the software application component is granted access to the content of the keystore. The flow then ends.

Thus, according to an embodiment, a keystore access control system can, at least in part, control access to one or more keystores by using fine-grained authorization policies to control runtime access of the one or more keystores. The keystore access control system can apply the one or more fine-grained authorization policies at runtime determine whether to grant or deny a software application component access to the keystore. Thus, according to the embodiment, the keystore access control system can eliminate a password requirement for accessing the one or more keystores, which can reduce the risk of an enterprise application that includes a plurality of software application components from employing weak securing practices for storing passwords and comprising content of the one or more keystores. Further, according to the embodiment, the verification of an identity of a software application component (as in the example of password-based keystores) is no longer the responsibility of the keystore implementation, and can be through any mechanism that exists in the enterprise application orthogonal to how the keystore is secured. Additionally, the use of fine-grained authorization policies can provide for more finely-tuned access control than the use of keystore passwords, such as controlling access based on a host associated with a software application component or time of day.

In addition, according to an embodiment, an authorization decision and its enforcement can be separated. An authorization engine can make an authorization decision based on one or more authorization policies. The result of the authorization decision is not merely enforced as a grant or denial of access to the requested content of the keystore, but can also be enhanced with constraints that apply to the use of the key material (e.g., a requestor can be granted access to the keystore, but only for a period of time that is declared in the authorization policy, or the request could be granted access to the key only for specific usage, such as decrypting a particular entity). Further, by separating the authorization polices governing access from how the keystores are secured, the mechanism for securing the keystores can be determined independently based on enterprise requirements. Additionally, keystore encryption itself can be driven by the authorization policies.

Thus, embodiments of the invention can provide significant increased value to enterprise applications. Consumers are not required to store passwords for every keystore that each software application component may use. Further, a software application component is not required to prompt for a keystore password or pass the keystore password through an insecure mechanism (e.g. a system property that can be viewed by looking at a running process). In addition, an administrator can be provided an ability to use authorization policies to secure keystores instead of passwords, which can ease the process of enabling secure communications (e.g., SSL) within an enterprise application. Additionally, by defining authorization policies that can secure keystores within a central authorization policy store, the authorization policies can be changed and enforced centrally, rather than by a consumer. Therefore, embodiments of the invention can provide better manageability of authorization policies, strong enforcement of security of keystores as needed, and separation of duties between who can access a keystore, and who manages storage of the keystore.

In addition, common policies can be defined and a system can be structured such that every keystore created for management by a keystore access control system has the common policy applied by default. This eases administrative burden, enabling the system to be secure according to a default policy. Additionally, policies can be defined centrally and declared to be applicable to a collection of keystores and application stripes in a keystore access control system, removing the need to define policies individually for keystores or application stripes within the keystore access control system.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to control access to a keystore, the controlling the access comprising:
   modeling an authorization policy configured to control access to the keystore, wherein the keystore comprises a storage entity stored on a repository, wherein the authorization policy comprises a context component and an environment component;
   storing the authorization policy in a policy store;
   receiving a request to access content of the keystore from a software application component;
   identifying a context and an environment associated with the software application component;
   applying the stored authorization policy to the request to determine whether access to the content of the keystore is granted;
   wherein the applying the stored authorization policy further comprises determining whether the identified context complies with the context component of the stored authorization policy, and determining whether the identified environment complies with the environment component of the stored authorization policy;
   granting the software application component access to the content of the keystore when it is determined that access to the content of the keystore is granted; and
   denying the software application component access to the content of the keystore when it is determined that access to the content of the keystore is not granted.

2. The non-transitory computer-readable medium of claim 1, wherein the content of the keystore further comprises at least one of: one or more cryptographic keys, or one or more cryptographic certificates.

3. The non-transitory computer-readable medium of claim 1, wherein the context component comprises a host,
   wherein the identified context comprises a host associated with the software application component, and
   wherein the determining whether the identified context complies with the context component further comprises determining whether the host associated with the software application component complies with the host of the context component.

4. The non-transitory computer-readable medium of claim 3, wherein the environment component comprises a time,
   wherein the identified environment comprises a time of the request, and
   wherein the determining whether the identified environment complies with the environment component further comprises determining whether the time of the request complies with the time of the environment component.

5. The non-transitory computer-readable medium of claim 1, wherein the granting the software application component access to the content of the keystore further comprises granting the software application component full access to the content of the keystore.

6. The non-transitory computer-readable medium of claim 1, wherein the granting the software application component access to the content further comprises granting the software application component limited access to the content of the keystore.

7. The non-transitory computer-readable medium of claim 6, wherein the limited access to the content of the keystore further comprises one of read-only access to the content of the keystore or write-only access to the content of the keystore.

8. The non-transitory computer-readable medium of claim 6, wherein the limited access to the content of the keystore further comprises access to only one or more cryptographic keys or cryptographic certificates of the keystore.

9. The non-transitory computer-readable medium of claim 1, the controlling the access further comprises executing the request to access the content of the keystore when the software application component is granted access to the content of the keystore, or returning an error message when the software application component is denied access to the content of the keystore.

10. The non-transitory computer-readable medium of claim 9, wherein the request to access the content of the keystore comprises at least one of, creating a new keystore, accessing one or more keys or certificates within the keystore, updating one or more keys or certificates within the keystore, or deleting one or more keys or certificates within the keystore.

11. A computer-implemented method for controlling access to a keystore, the computer-implemented method comprising:
    modeling an authorization policy configured to control access to the keystore, wherein the keystore comprises a storage entity stored on a repository, wherein the authorization policy comprises a context component and an environment component;
    storing the authorization policy in a policy store;
    receiving a request to access content of the keystore from a software application component;
    identifying a context and an environment associated with the software application component;
    applying the stored authorization policy to the request to determine whether access to the content of the keystore is granted;
    wherein the applying the stored authorization policy further comprises determining whether the identified context complies with the context component of the stored authorization policy, and determining whether the identified environment complies with the environment component of the stored authorization policy;
    granting the software application component access to the content of the keystore when it is determined that access to the content of the keystore is granted; and
    denying the software application component access to the content of the keystore when it is determined that access to the content of the keystore is not granted.

12. The computer-implemented method of claim 11, wherein the context component comprises a host,
    wherein the identified context comprises a host associated with the software application component, and
    wherein the determining whether the identified context complies with the context component further comprises determining whether the host associated with the software application component complies with the host of the context component.

13. The computer-implemented method of claim 12, wherein the environment component comprises a time,
    wherein the identified environment comprises a time of the request, and wherein the determining whether the identified environment complies with the environment component further comprises determining whether the time of the request complies with the time of the environment component.

14. The computer-implemented method of claim 11, wherein the granting the software application component access to the content of the keystore further comprises granting the software application component full access to the content of the keystore.

15. The computer-implemented method of claim 11, wherein the granting the software application component access to the content further comprises granting the software application component limited access to the content of the keystore.

16. A keystore access control system, comprising:
a processor;
a memory configured to store one or more instructions;
an authorization policy modeling module configured to model an authorization policy configured to control access to the keystore, wherein the keystore comprises a storage entity stored on a repository, wherein the authorization policy comprises a context component and an environment component;
wherein the authorization policy modeling module is further configured to store the authorization policy in a policy store;
an authorization policy application module configured to receive a request to access content of the keystore from a software application component;
wherein the authorization policy application module is further configured to identify a context and an environment associated with the software application component;
wherein the authorization policy application module is further configured to apply the stored authorization policy to the request to determine whether access to the content of the keystore is granted;
wherein the authorization policy application module is further configured to determine whether the identified context complies with the context component of the stored authorization policy, and determine whether the identified environment complies with the environment component of the stored authorization policy;
wherein the authorization policy application module is further configured to grant the software application component access to the content of the keystore when it is determined that access to the content of the keystore is granted; and
wherein the authorization policy application module is further configured to deny the software application component access to the content of the keystore when it is determined that access to the content of the keystore is not granted.

17. The keystore access control system of claim 16, wherein the context component comprises a host,
wherein the identified context comprises a host associated with the software application component, and
wherein the authorization policy application module is further configured to determine whether the host associated with the software application component complies with the host of the context component.

18. The keystore access control system of claim 17,
wherein the environment component comprises a time,
wherein the identified environment comprises a time of the request, and
wherein the authorization policy application module is further configured to determine whether the time of the request complies with the time of the environment component.

19. The keystore access control system of claim 16, wherein the authorization policy application module is further configured to grant the software application component full access to the content of the keystore.

20. The keystore access control system of claim 16, wherein the authorization policy application module is further configured to grant the software application component limited access to the content of the keystore.

* * * * *

UNITED STATES PATENT AND TRADEMARK OFFICE
CERTIFICATE OF CORRECTION

| | |
|---|---|
| PATENT NO. | : 8,726,342 B1 |
| APPLICATION NO. | : 13/664517 |
| DATED | : May 13, 2014 |
| INVENTOR(S) | : Agarwal et al. |

Page 1 of 1

It is certified that error appears in the above-identified patent and that said Letters Patent is hereby corrected as shown below:

In the Specification

Column 7, lines 5-6, after "Application))" insert -- . --.

Signed and Sealed this
Fourteenth Day of October, 2014

Michelle K. Lee
*Deputy Director of the United States Patent and Trademark Office*